United States Patent
Zabic

(10) Patent No.: US 10,249,066 B2
(45) Date of Patent: Apr. 2, 2019

(54) SYSTEM AND METHOD FOR MPR STREAK REDUCTION

(71) Applicant: UIH AMERICA, INC., Houston, TX (US)

(72) Inventor: Stanislav Zabic, Houston, TX (US)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 25 days.

(21) Appl. No.: 15/487,809

(22) Filed: Apr. 14, 2017

(65) Prior Publication Data

US 2018/0300908 A1    Oct. 18, 2018

(51) Int. Cl.
    *G06T 5/00*        (2006.01)
    *G06T 11/00*      (2006.01)
    *G06T 5/50*        (2006.01)
    *G06T 3/40*        (2006.01)
    *G06T 5/20*        (2006.01)

(52) U.S. Cl.
    CPC .......... *G06T 11/008* (2013.01); *G06T 3/4007* (2013.01); *G06T 5/002* (2013.01); *G06T 5/005* (2013.01); *G06T 5/20* (2013.01); *G06T 5/50* (2013.01); *G06T 2207/10081* (2013.01); *G06T 2207/20032* (2013.01)

(58) Field of Classification Search
None
See application file for complete search history.

(56) References Cited

U.S. PATENT DOCUMENTS

2007/0268997 A1* 11/2007 Zhu ...................... A61B 6/5282
                                                                        378/7

FOREIGN PATENT DOCUMENTS

| AU | 2006235815 A1 | 5/2008 | |
|----|---|---|---|
| WO | WO 2008064367 A2 * | 5/2008 | ........... G06T 11/006 |
| WO | WO2008064367 A2 | 5/2008 | |

OTHER PUBLICATIONS

Samuel Moon-Ho Song et al., Interpolation of CT Slices for 3-D Visualization by Maximum Intensity Projections, Electronic Publishing, Artistic Imaging, and Digital Typogr, Lecture Notes in Computer Science, ISSN 0302-9743, Springer Verlag, DE, vol. 2532, Jan. 1, 2002, pp. 1065-1072, XP007902351, ISBN: 978-3-540-24128-7.

(Continued)

*Primary Examiner* — Delomia L Gilliard
(74) *Attorney, Agent, or Firm* — Metis IP LLC

(57) ABSTRACT

A system and method for reducing streak artifacts in a multiplanar reconstruction image are provided. The method may include: retrieving a first image volume from image data, the first image volume including multiple images, at least one of which includes a streak artifact including multiple streaks of a streak width along a first direction; down sampling the first image volume along the first direction at an image increment equal to the streak width to generate a second image volume; equalizing the second image volume along a second direction to generate a third image volume; up sampling the third image volume along the first direction to generate a fourth image volume; determining an error image volume based on the fourth image volume and the first image volume; correcting the first image volume according to the error image volume; and generating, based on the corrected first image volume, a corrected image volume.

20 Claims, 15 Drawing Sheets

(56) References Cited

OTHER PUBLICATIONS

European Search Report in in European Application No. 17178678.3 dated Jan. 29, 2018, 8 pages.

* cited by examiner

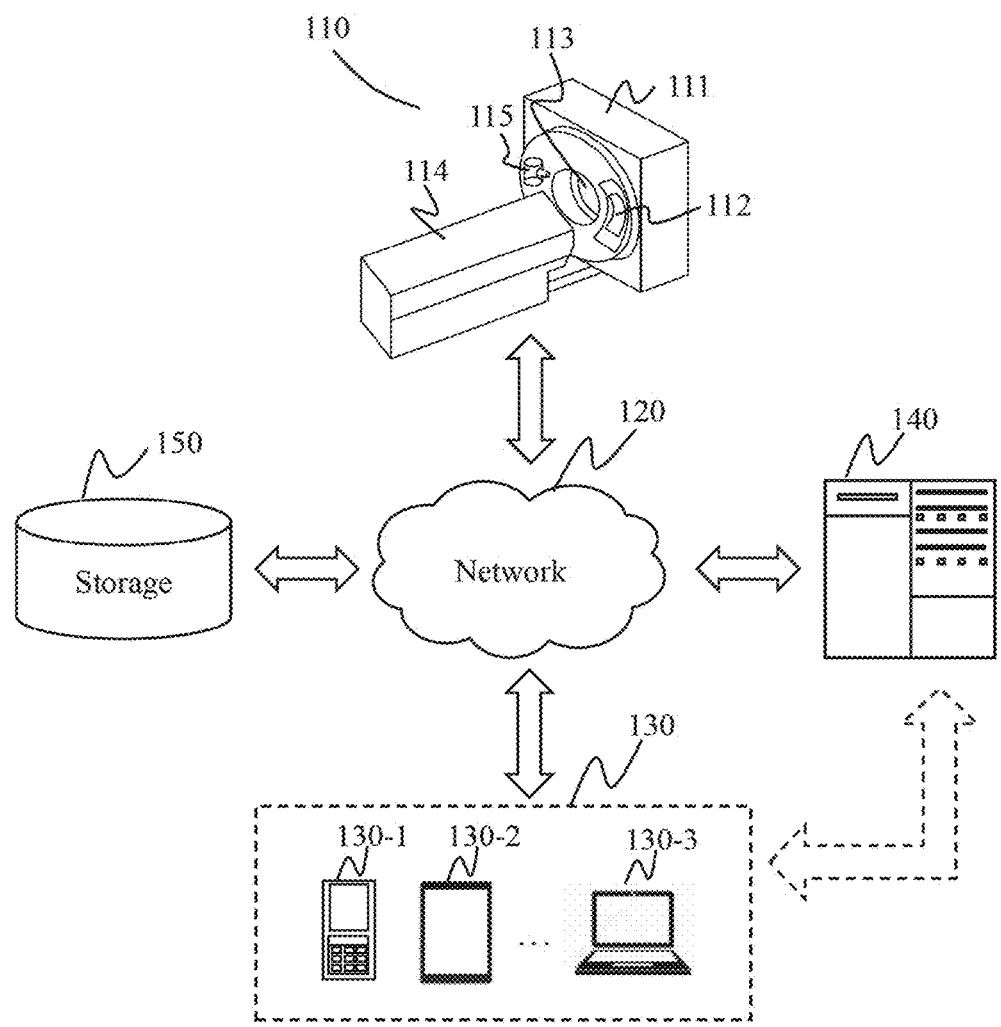
FIG. 1-A

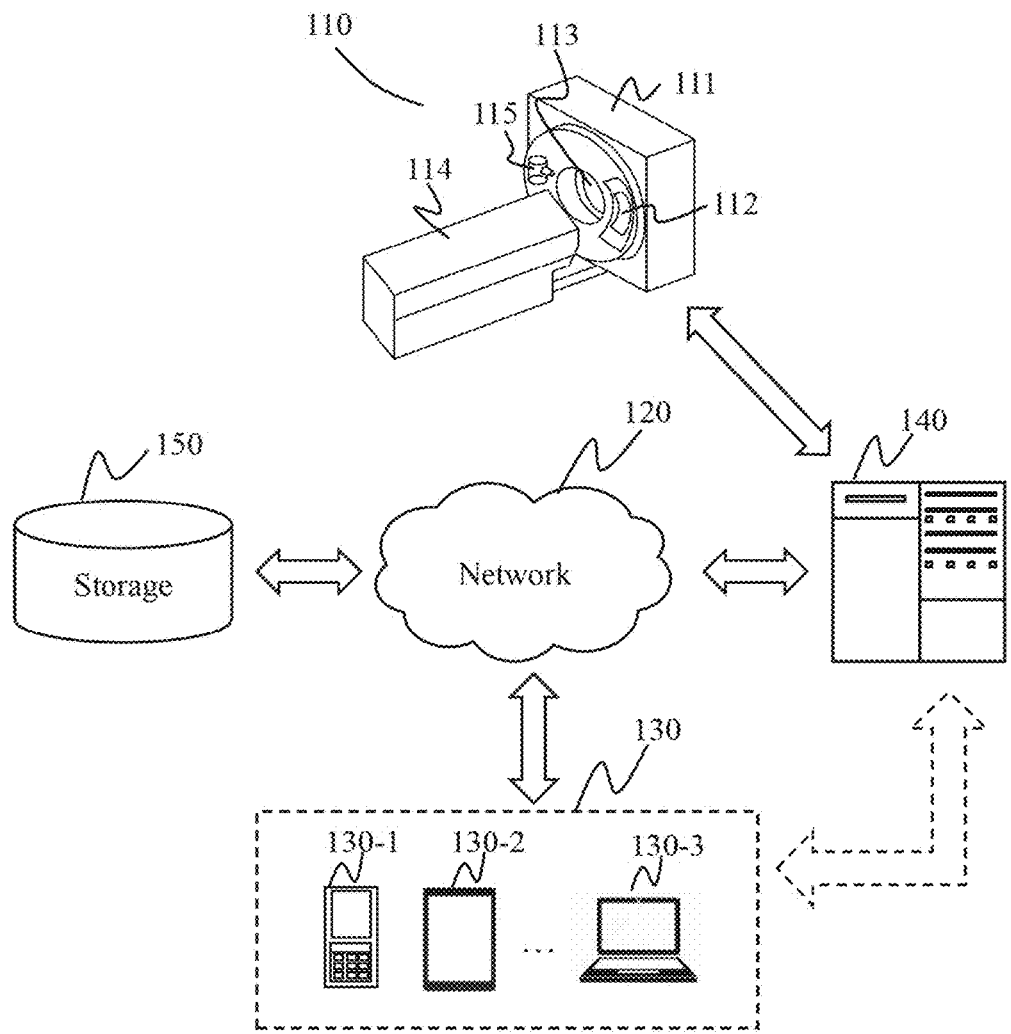
FIG. 1-B

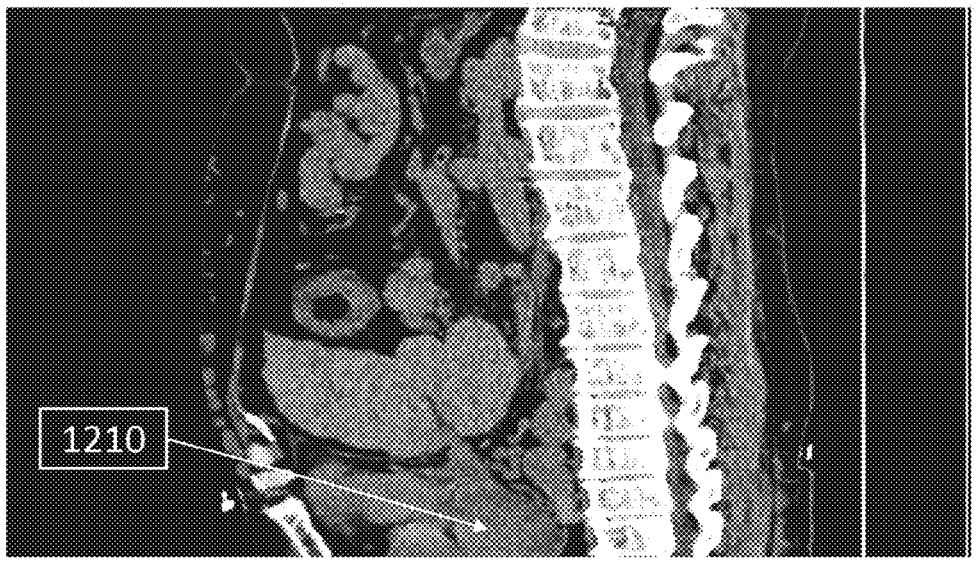
FIG. 12-A
FIG. 12-B

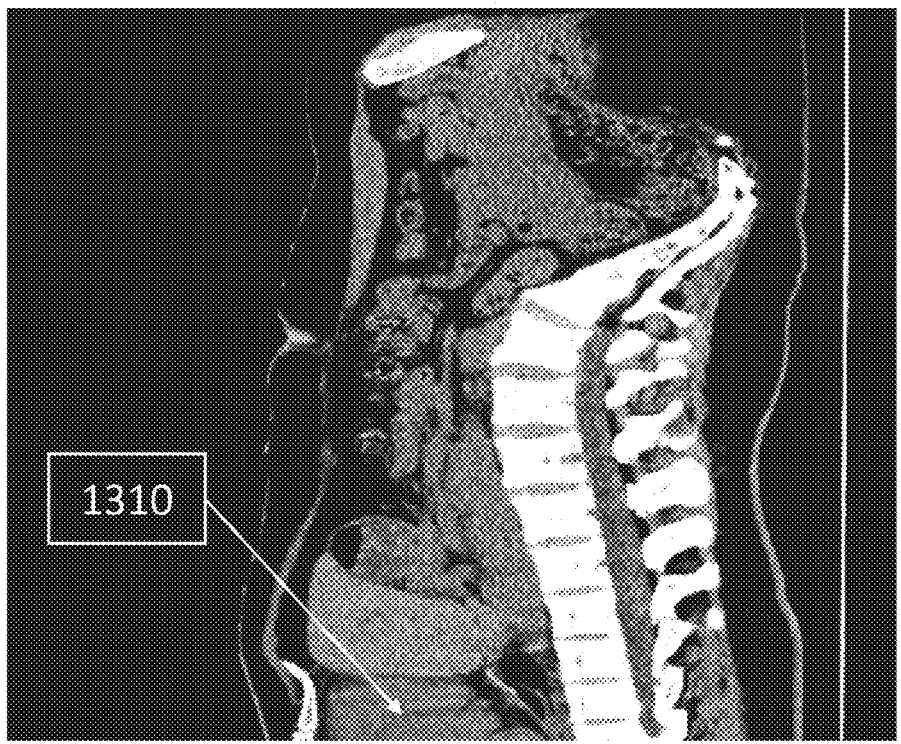
FIG. 13-A
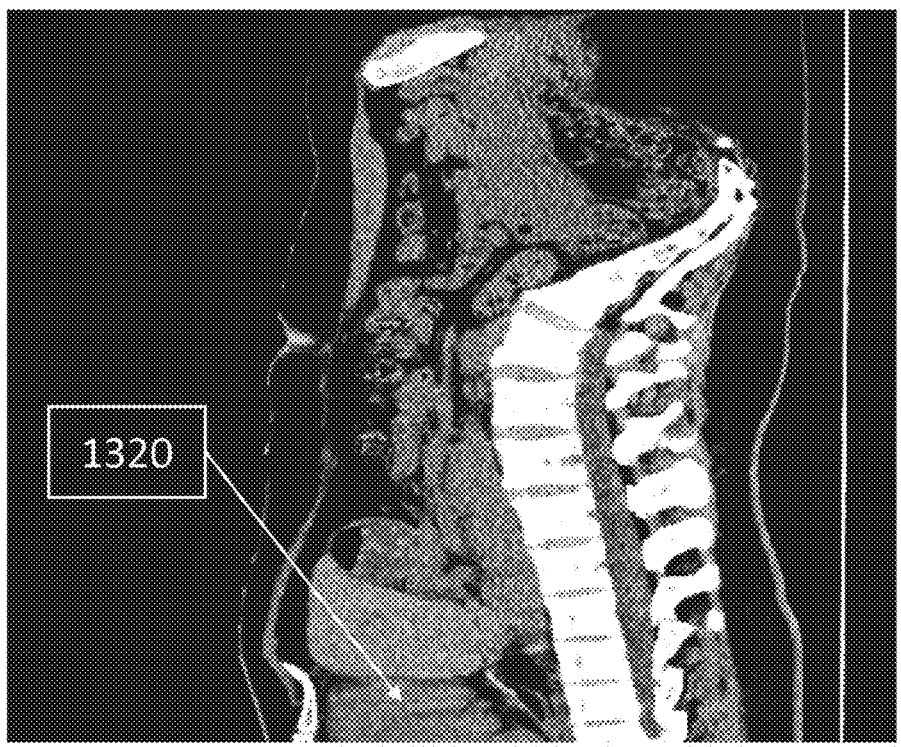
FIG. 13-B

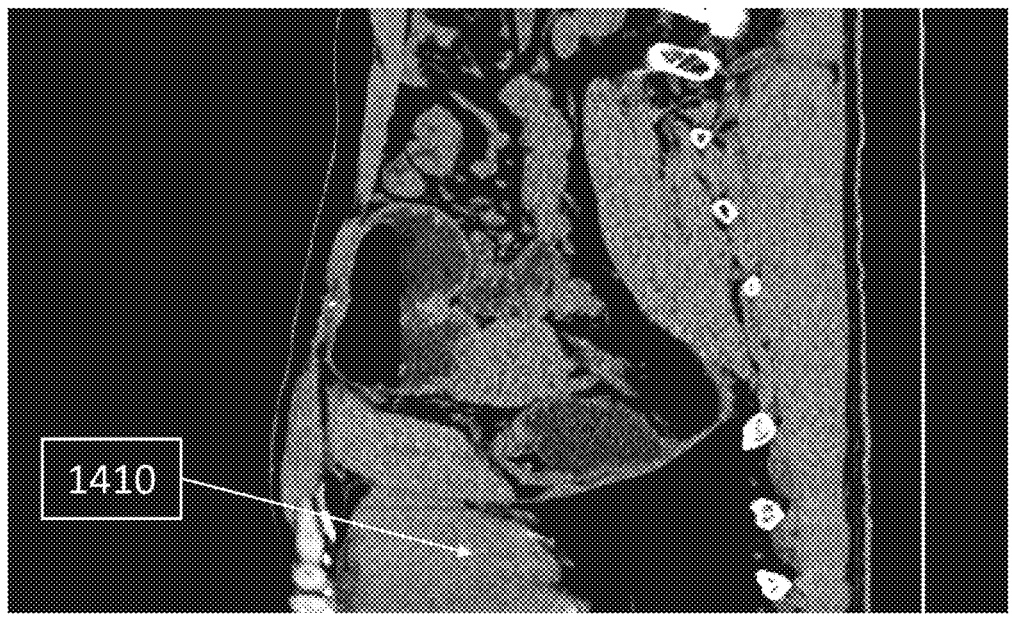
FIG. 14-A
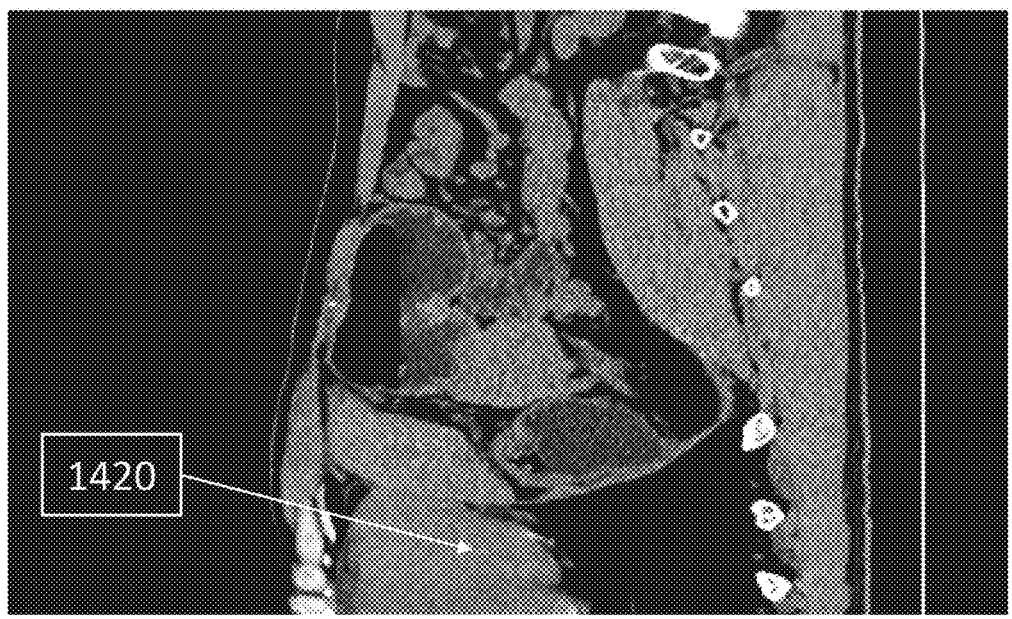
FIG. 14-B

SYSTEM AND METHOD FOR MPR STREAK REDUCTION

TECHNICAL FIELD

The present disclosure generally relates to reduction of image artifact, and more specifically relates to a system and method for reducing streaks in a multiplanar reconstruction (MPR) image.

BACKGROUND

Computed Tomography (CT) has been widely used for imaging, diagnosis and. Multiplanar reconstruction (MPR) is an image reconstruction technique. A volume is built by stacking axial slices. The slices may be then cut through the volume in a different plane. However, 3D reconstruction of CT data may leave linear streak in MPR images due to various reasons, including cone beam artifacts, poor sampling in z-direction, beam hardening or some type of miscalibration, or the like, or a combination thereof. Linear streak may be between 2-3 mm wide and may occur in much high frequency in the z-direction. This processing detects and reduces this type of artifacts.

SUMMARY

In a first aspect of the present disclosure, a system for reducing streaks in a multiplanar reconstruction (MPR) image is provided. The system may include at least one processor and instructions. When the at least one processor executes the instructions, the at least one processor may be directed to perform one or more of the following operations. The at least one processor may receive image data. The at least one processor may retrieve a first image volume from the image data. The first image volume may include a plurality of images. At least one image of the plurality of images may include a streak artifact. The streak artifact may include a plurality of streaks of a streak width along a first direction. The at least one processor may down sample the first image volume along the first direction at an image increment equal to the streak width to generate a second image volume. The at least one processor may equalize the second image volume along a second direction to generate a third image volume. The at least one processor may up sample the third image volume along the first direction to generate a fourth image volume. The at least one processor may determine an error image volume based on the fourth image volume and the first image volume, the error image volume including one or more error images. The at least one processor may correct the first image volume according to the error image volume. The at least one processor may generate, based on the corrected first image volume, a corrected image volume. In the corrected image volume the streak artifact may be reduced or removed.

In some embodiments, the at least one processor may resize an image of the plurality of images from a first size to a second size.

In some embodiments, the first direction may be the same as the second direction.

In some embodiments, the streak width may be 0.1 mm to 5 mm.

In some embodiments, equalizing the second image volume may be operated by a median filter.

In some embodiments, size of the median filter may be 4.

In some embodiments, the at least one processor may mirror-symmetrically pad the second image volume along the first direction.

In some embodiments, the at least one processor may blur the one or more error images in the error image volume.

In some embodiments, the at least one processor may operate a Gaussian filter to blur the one or more error images in the error image volume.

In some embodiments, the at least one processor may operate nearest neighbor interpolation to up sample and/or down sample.

In a second aspect of the present disclosure, a method for reducing streaks in a multiplanar reconstruction (MPR) image is provided. The method may include one or more of the following operations. Image data may be received. A first image volume may be retrieved from the image data. The first image volume may include a plurality of images. At least one image of the plurality of images may include a streak artifact. The streak artifact may include a plurality of streaks of a streak width along a first direction. A second image volume may be generated by down sampling the first image volume along the first direction at an image increment equal to the streak width. A third image volume may be generated by equalizing the second image volume along a second direction. A fourth image volume may be generated by up sampling the third image volume along the first direction. An error image volume may be determined based on the fourth image volume and the first image volume. The error image volume may include one or more error images. The first image volume may be corrected according to the error image volume. A corrected image volume may be generated based on the corrected first image volume. In the corrected image volume the streak artifact may be reduced or removed.

In some embodiments, an image of the plurality of images may be resized from a first size to a second size.

In some embodiments, the first direction may be the same as the second direction.

In some embodiments, the streak width may be 0.1 mm to 5 mm.

In some embodiments, equalizing the second image volume may be operated by a median filter.

In some embodiments, size of the median filter may be 4.

In some embodiments, the second image volume may be mirror-symmetrically padded along the first direction.

In some embodiments, the one or more error images in the error image volume may be blurred.

In some embodiments, the one or more error images in the error image volume may be blurred by a Gaussian filter.

In some embodiments, up sampling and/or down sampling may be operated by nearest neighbor interpolation.

In a third aspect of the present disclosure, a non-transitory computer readable medium is provided. The non-transitory computer readable medium may include executable instructions. When at least one processor executes the instructions, the at least one processor may effectuate a method including one or more of the following operations. A first image volume may be retrieved from the image data. The first image volume may include a plurality of images. At least one image of the plurality of images may include a streak artifact. The streak artifact may include a plurality of streaks of a streak width along a first direction. A second image volume may be generated by down sampling the first image volume along the first direction at an image increment equal to the streak width. A third image volume may be generated by equalizing the second image volume along a second direction. A fourth image volume may be generated by up sampling the third image volume along the first direction. An error image volume may be determined based on the fourth image volume and the first image volume. The error image volume may include one or more error images. The first image volume may be corrected according to the error image volume. A corrected image volume may be generated based on the corrected first image volume. In the corrected image volume the streak artifact may be reduced or removed.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 1-A and FIG. 1-B are schematic diagrams illustrating an exemplary CT system according to some embodiments of the present disclosure;

FIG. 12-A is an original MPR image;

FIG. 12-B is a corrected MPR image generated by performing an artifact removal process disclosed herein on the original MPR image illustrated in FIG. 11-A according to some embodiments of the present disclosure;

FIG. 13-A is an original MPR image;

FIG. 13-B is a corrected MPR image generated by performing an artifact removal process disclosed herein on the original MPR image illustrated in FIG. 12-A according to some embodiments of the present disclosure;

FIG. 14-A is an original MPR image; and

FIG. 14-B is a corrected MPR image generated by performing an artifact removal process disclosed herein on the original MPR image illustrated in FIG. 13-A according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by other expression if they achieve the same purpose.

Figure 2:
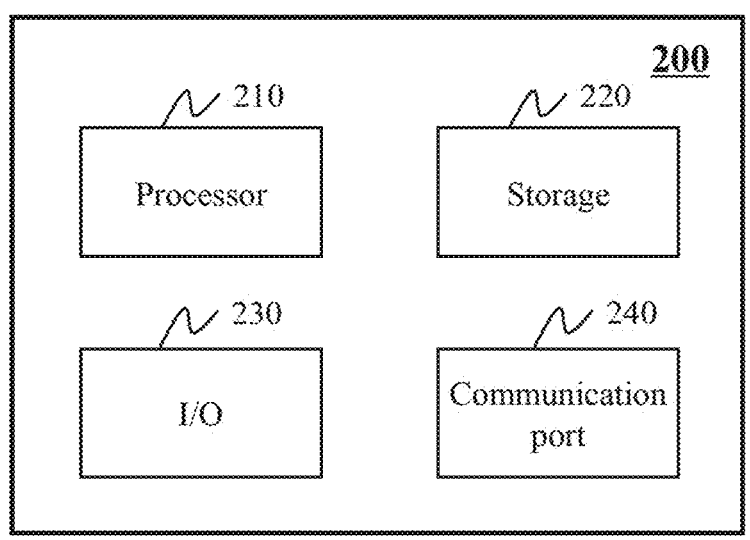
FIG. 2 is a schematic diagram illustrating an architecture of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for non-invasive imaging, such as for disease diagnosis or research purposes. In some embodiments, the imaging system may be a computed tomography (CT) system, an emission computed tomography (ECT) system, a magnetic resonance imaging (MRI) system, an ultrasonography system, an X-ray photography system, a positron emission tomography (PET) system, or the like, or any combination thereof.

The following description is provided to help better understanding CT image reconstruction methods or systems. The term "image" used in this disclosure may refer to a 2D image, a 3D image, a 4D image, or any related image data (e.g., CT data, projection data corresponding to the CT data). This is not intended to limit the scope the present disclosure. For persons having ordinary skills in the art, a certain amount of variations, changes, and/or modifications may be deducted under guidance of the present disclosure. Those variations, changes, and/or modifications do not depart from the scope of the present disclosure.

FIG. 1-A and FIG. 1-B are a schematic diagrams illustrating an exemplary CT system according to some embodiments of the present disclosure. The CT system may include a CT scanner 110, a network 120, a terminal 130, a processing engine 140, and a storage 150.

The CT scanner 110 may include a gantry 111, a detector 112, a detecting region 113, a subject table 114, and a radioactive scanning source 115. The gantry 111 may support the detector 112 and the radioactive scanning source 115. A subject may be placed on the subject table 114 to be scanned. The radioactive scanning source 115 may emit radioactive rays to the subject. The detector 112 may detect radiation events (e.g., gamma photons) emitted from the detecting region 113. In some embodiments, the detector 112 may include a plurality of detector units. The detector units may include a scintillation detector (e.g., a cesium iodide detector) or a gas detector. The detector unit may be a single-row detector or a multi-rows detector.

The network 120 may facilitate exchange of information and/or data. In some embodiments, one or more components in the CT system 100 (e.g., the CT scanner 110, the terminal 130, the processing engine 140, or the storage 150) may send information and/or data to other component(s) in the CT system 100 via the network 120. For example, the processing engine 140 may obtain image data from the CT scanner 110 via the network 120. As another example, the processing engine 140 may obtain user instructions from the terminal 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points through which one or more components of the CT system 100 may be connected to the network 120 to exchange data and/or information.

The terminal 130 include a mobile device 130-1, a tablet computer 130-2, a laptop computer 130-3, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, the terminal 130 may be part of the processing engine 140.

The processing engine 140 may process data and/or information obtained from the CT scanner 110, the terminal 130, or the storage 150. In some embodiments, the processing engine 140 may be a single server, or a server group. The server group may be centralized, or distributed. In some embodiments, the processing engine 140 may be local or remote. For example, the processing engine 140 may access information and/or data stored in the CT scanner 110, the terminal 130, and/or the storage 150 via the network 120. As another example, the processing engine 140 may be directly connected to the CT scanner 110, the terminal 130 and/or the storage 150 to access stored information and/or data. In some embodiments, the processing engine 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing engine 140 may be implemented on a computing device 200 having one or more components illustrated in FIG. 2 in the present disclosure.

The storage 150 may store data and/or instructions. In some embodiments, the storage 150 may store data obtained from the terminal 130 and/or the processing engine 140. In some embodiments, the storage 150 may store data and/or instructions that the processing engine 140 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components in the CT system 100 (e.g., the processing engine 140, the terminal 130). One or more components in the CT system 100 may access the data or instructions stored in the storage 150 via the network 120. In some embodiments, the storage 150 may be directly connected to or communicate with one or more components in the CT system 100 (e.g., the processing engine 140, the terminal 130). In some embodiments, the storage 150 may be part of the processing engine 140.

FIG. 2 is a schematic diagram illustrating exemplary hardware and/or software components of an exemplary computing device 200 on which the processing engine 140 may be implemented according to some embodiments of the present disclosure. As illustrated in FIG. 2-A, the computing device 200 may include a processor 210, a storage 220, an input/output (I/O) 230, and a communication port 240.

The processor 210 may execute computer instructions (program code) and perform functions of the processing engine 140 in accordance with techniques described herein. The computer instructions may include routines, programs, objects, components, data structures, procedures, modules, and functions, which perform particular functions described herein. For example, the processor 210 may process image data obtained from the CT scanner 110, the terminal 130, the storage 150, or any other component of the CT system 100. In some embodiments, the processor 210 may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be note that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., a first processor executes step A and a second processor executes step B, or the first and second processors jointly execute steps A and B).

The storage 220 may store data/information obtained from the CT scanner 110, the terminal 130, the storage 150, or any other component of the CT system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure.

The I/O 230 may input or output signals, data, or information. In some embodiments, the I/O 230 may enable a user interaction with the processing engine 140. In some embodiments, the I/O 230 may include an input device and an output device. Exemplary input device may include a keyboard, a mouse, a touch screen, a microphone, or the like, or a combination thereof. Exemplary output device may include a display device, a loudspeaker, a printer, a projector, or the like, or a combination thereof. Exemplary display device may include a liquid crystal display (LCD), a light-emitting diode (LED)-based display, a flat panel display, a curved screen, a television device, a cathode ray tube (CRT), or the like, or a combination thereof.

The communication port 240 may be connected to a network (e.g., the network 120) to facilitate data communications. The communication port 240 may establish connections between the processing engine 140 and the CT scanner 110, the terminal 130, or the storage 150. The connection may be a wired connection, a wireless connection, or combination of both that enables data transmission and reception. The wired connection may include electrical cable, optical cable, telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
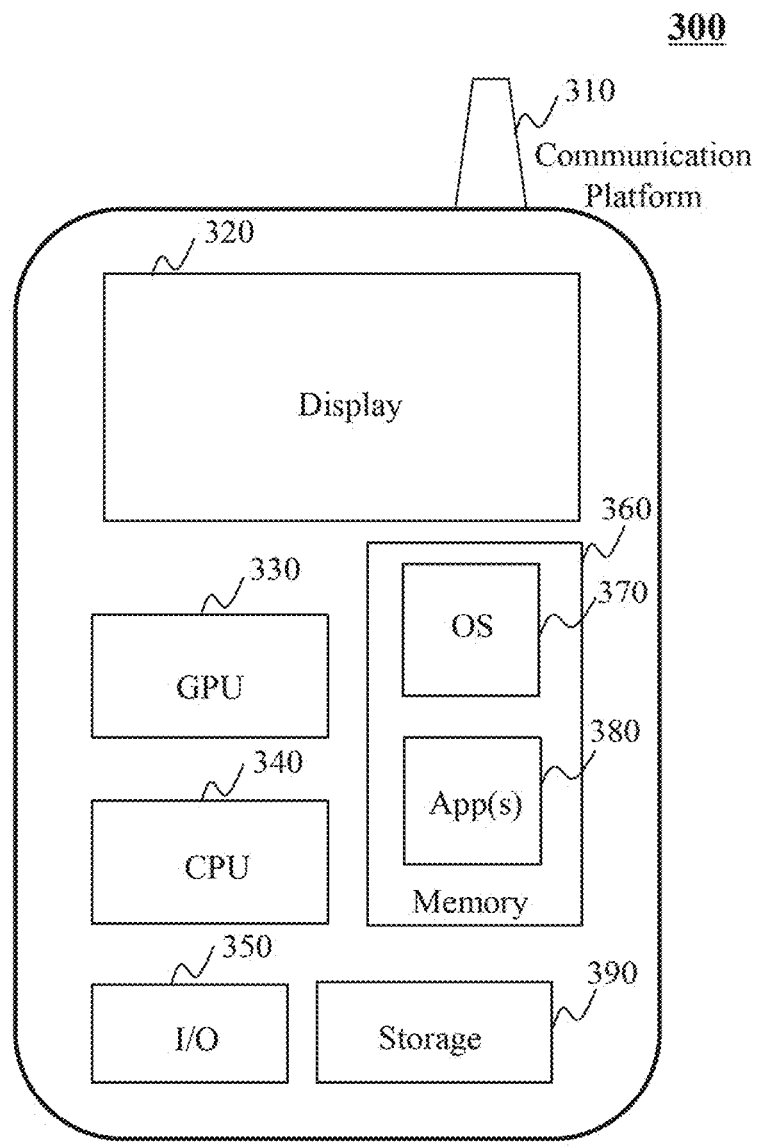
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the terminal 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing engine 140. User interactions with the information stream may be achieved via the I/O 350 and provided to the processing engine 140 and/or other components of the CT system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to the blood pressure monitoring as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 4:
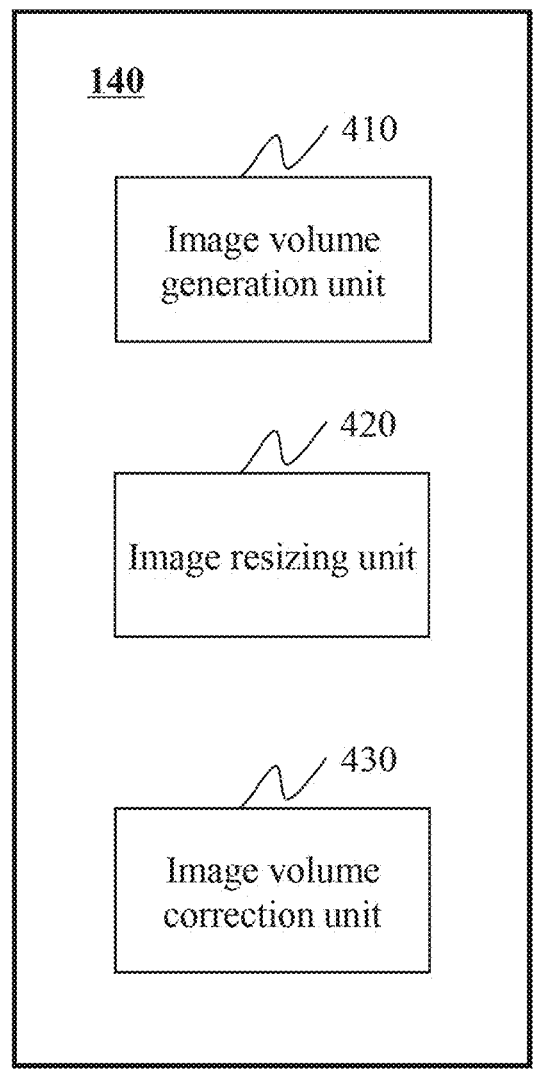
FIG. 4 is a schematic diagram illustrating an exemplary processor according to some embodiments of the present disclosure.

FIG. 4 is a schematic diagram illustrating an exemplary processing engine 140 according to some embodiments of the present disclosure. Processing engine 140 may process data obtained from or via CT scanner 110, processor 210, storage 220, input/output (I/O) 230, communication port 240, or the like, or any combination thereof. The data processed by processing engine 140 may include projection data, correction data, filtered data, image data (e.g., original image data), or the like, or any combination thereof. Processing engine 140 may perform operations including, for example, data preprocessing, image reconstruction, image correction, image composition, lookup table creation, or the like, or any combination thereof. Processing engine 140 may reconstruct an image based on the projection data obtained from CT scanner 110. Processing engine 140 may include an image volume generation unit 410, an image resizing unit 420, and an image volume correction unit 430. Processing engine 140, or a portion thereof, may be implemented on the computing device 200 as illustrated in FIG. 2.

Image volume generation unit 410 may generate an axial image or a stack of axial CT images representing anatomic information in three dimensions. An axial image may refer to an image in the axial plane. The image may be generated based on a reconstruction algorithm. Exemplary reconstruction algorithm may include a Fourier slice theorem algorithm, a filtered back projection (FBP) algorithm, a fan-beam reconstruction algorithm, an iterative reconstruction algorithm, an analytic reconstruction algorithm, an algorithm based on compressed sensing (CS), or the like, or any combination thereof.

In some embodiments, image volume generation unit 410 may generate an image volume according to the images generated by image volume generation unit 410 or other images. In some embodiments, the image volume may be built by stacking axial images. The image volume data may be used to reconstruct an image in sagittal or coronal projection. In some embodiments, multiplanar reconstruction (MPR) may be the reformatting of the image volume into tomographic images by selecting, from the image volume, pixel values that correspond to the desired tomographic image planes.

In some embodiments, image volume generation unit 410 may generate image volume I. Image volume I may include a plurality of images. An image may include a plurality of pixels. $I(:, :, :)$ may denote all images and/or pixels in the image volume I. $I(:, :, :)$ may also denote the image data set of image volume I. $I(:, :, k)$ may denote a certain axial image k and/or pixels of image k in the image volume I. $I(:, :, k)$ may also denote the image data set of the image k. $I(i,j,k)$ may denote a pixel and/or the pixel value of a certain position $(i,j)$ in a certain image k. $I(i,j,:)$ may denote all pixels and/or pixel values of a certain position $(i,j)$ in all images in the image volume I. A pixel value may refer to the value of a property of the pixel. For instance, a pixel value may refer to the luminance value of a pixel, the grey value of a pixel, the color or RGB value of a pixel, the saturation value of a pixel, or the like, or a combination thereof. The image data set of an image and/or an image volume may include the pixel values of the pixels in the image and/or in the image volume, such as gray value, RGB value, luminance value, saturation value, or the like, or any combination thereof.

MPR may be used to produce images that are parallel to one or more of three orthogonal planes, for example, the orthogonal anatomical planes including the axial plane, the coronal plane, and the sagittal plane. As used herein, an axial image may refer to an image in the axial plane. As used herein, a coronal image may refer to an image in the coronal plane. As used herein, a sagittal image may refer to an image in the sagittal plane. Merely by way of example, image volume I may include a stack of axial images. A coronal image may be formed from image volume I based on a specific row of pixels from each of one or more axial images of the stack of axial images. Similarly, a sagittal image may be created based on a specific column of pixel values from each of one or more axial images of the stack of axial images.

In some embodiments, oblique reconstruction may be performed in an oblique plane that is not orthogonal to the axial plane to produce an MPR image in the oblique plane. In some embodiments, a curved MPR image may be produced. For instance, a curved MPR image may be obtained along a user-determined curved plane through the image volume that follows an anatomic structure such as the spine, the aorta, a coronary artery, etc. In MPR, in creating an oblique image or a curved image, a pixel of the MPR image (or referred to as an MPR pixel for brevity) may correspond to a point located in the interval or vicinity of one or more pixels in the image volume, but not a pixel in the image volume. In this case, the value of the pixel in the MPR image (or referred to as an MPR pixel) may be created by way of, for example, interpolation, extrapolation, etc., based on the value(s) of the one or more neighbor pixels of the image volume. As used herein, a neighbor pixel of a point in an image volume may refer to a pixel in the vicinity of the point, e.g., within a threshold distance from the point. Merely by way of example, the threshold distance may be the distance between two adjacent pixels located next to each other along a direction. A point in an image volume may have one or more neighbor pixels.

In some embodiments, reconstruction of CT data may sometimes leave a streak artifact including, for example, a linear streak, in an MPR image due to various reasons including, for example, cone beam artifacts, poor sampling in z-direction, beam hardening, mis-calibration, or the like, or a combination thereof. A linear streak may be between 2-3 mm wide in the z-direction. In some embodiments, the z-direction is perpendicular to the axial plane. In some embodiment, a plurality of linear streaks may be substantially parallel to each. Merely by way of example, the linear streaks in an image are substantially parallel to each other, and perpendicular to substantially one direction (e.g., the z-direction). In some embodiments, this type of artifact may be reduced.

Image resizing unit 420 may resize part of or the entire images k in the image volume I, e.g., one or more images generated by the image volume generation unit 410. In some embodiments, various axial images in the image volume I may have different parameters including, for example, the pixel number, the size of a field of view (FOV), the pixel size, etc. Image resizing unit 420 may uniform or standardize the axial images so that they have at least one uniform parameter including, for example, pixel number, the size of the FOV, pixel size, etc., regardless of the reconstruction algorithm including one or more reconstruction parameters on the basis of which the images are generated. In some embodiments, the pixels of an axial image k in the image volume I may be distributed in a grid $G_1$, wherein $$G_1 = \left[-\frac{N_x}{2}; \frac{N_x}{2} - 1\right] \cdot d_x \times \left[-\frac{N_x}{2}; \frac{N_x}{2} - 1\right] \cdot d_x, \quad (1)$$

and $$d_x = D/N_x. \quad (2)$$

In Equations (1) and (2), $N_x$ may denote the size of an image matrix of image k, $d_x$ may denote pixel size of image k, and D may denote the size or dimension of a reconstructed field of view. As used herein, a scan FOV may correspond to an area that is actually scanned in a scanning. As used herein, a reconstructed FOV may refer to an FOV obtained by way of reconstruction of the scan data of the scanned FOV. In some embodiments, D may be a float number between 80 and 500 mm. In some embodiments, the size of an image matrix of image k may be pixel number of the row or the column of the image k.

Image resizing unit 420 may pad a grid $G_2$ with pixels of the axial images k in the image volume I distributed in grid $G_1$, wherein $$G_2 = \left[-\frac{N_{tx}}{2}; \frac{N_{tx}}{2} - 1\right] \cdot d_{tx} \times \left[-\frac{N_{tx}}{2}; \frac{N_{tx}}{2} - 1\right] \cdot d_{tx}, \quad (3)$$

and $$d_{tx} = D_{tx}/N_{tx}. \quad (4)$$

In Equations (3) and (4), $N_{tx}$ may denote the size of the image matrix of a resampled image k in grid $G_2$, and $d_{tx}$ may denote the pixel size of the resampled (e.g., down-sampled, up-sampled) image k in grid $G_2$. $N_{tx}$ may be a predetermined value. Merely by way of example, $N_x$ may be 96. $D_{tx}$ may denote the size or dimension the field of view of the resampled image matrix. In some embodiments, $D_{tx}$ may be a predetermined number. Merely by way of example, $D_{tx}$ may be 500 mm.

In some embodiments, the pixel number of $G_1$ and the pixel number of $G_2$ may be different. In some embodiments, the pixel number of $G_1$ may be larger than the pixel number of $G_2$. Image resizing unit 420 may be configured to pad $G_2$ with the pixel values of $G_1$. Image resizing unit 420 may scan through grids $G_1$ and $G_2$, and determine the values of pixels in grid $G_2$ based on the values of pixels in grid $G_1$. As used herein, a pixel (a, b) in a first grid may correspond to a pixel (c, d) in a second grid when $c/a=d/b=N_x/N_{tx}$. If a pixel of grid $G_2$ does not have a corresponding pixel in grid $G_1$, image resizing unit 420 may determine the value of the pixel in grid $G_2$ by way of, for example, interpolation based on the values of neighbor pixels close to or in the vicinity of (e.g., surrounding) where a corresponding pixel would be located in grid $G_1$. Merely by way of example, if a pixel of grid $G_2$ does not have a corresponding pixel in grid $G_1$, image resizing unit 420 may determine the value of the pixel in grid $G_2$ by way of interpolation based on the pixel values of a plurality of pixels (e.g., 2, or 3, or 4, or 5, or 6, or 7, or 8, or more than 8 pixels) surrounding where a corresponding pixel would be located in grid $G_1$. Exemplary interpolation algorithms may include nearest neighbor interpolation, linear interpolation, bilinear interpolation, quadratic interpolation, cubic spline interpolation, etc. Merely by way of example, image resizing unit 420 may perform nearest neighbor interpolation as shown in Equation (5) to transfer an image k from $G_1$ to $G_2$, $$I_d(:,:,k) = \text{nearest}(G_1, I(:,:,k), G_2). \quad (5)$$

With the images k in image volume I transferred from $G_1$ to $G_2$, a resized image volume $I_d$ including the images k resized from D to $D_{tx}$ may be generated.

Image volume correction unit 430 may correct the image volume generated by image volume generation unit 410 and/or image resizing unit 420. Image volume correction unit 430 may modify an image in the image volume so as to reduce streak in an image reconstructed from the image volume. In some embodiments, a streak may include pixels in the MPR image generated from a certain image volume with a relatively low intensity compared to their neighboring pixels in the MPR image. In some embodiments, a streak in the MPR image may appear to be about 3 mm wide in the z direction. A streak may appear at a low in-plane frequency in an image reconstructed from the image volume. Image volume correction unit 430 may flatten the streak. Image volume correction unit 430 may reduce or avoid affecting in-plane features of a mid-to-high frequency. More description of image volume correction unit 430 may be found in FIG. 6 and the description thereof.

Figure 5:
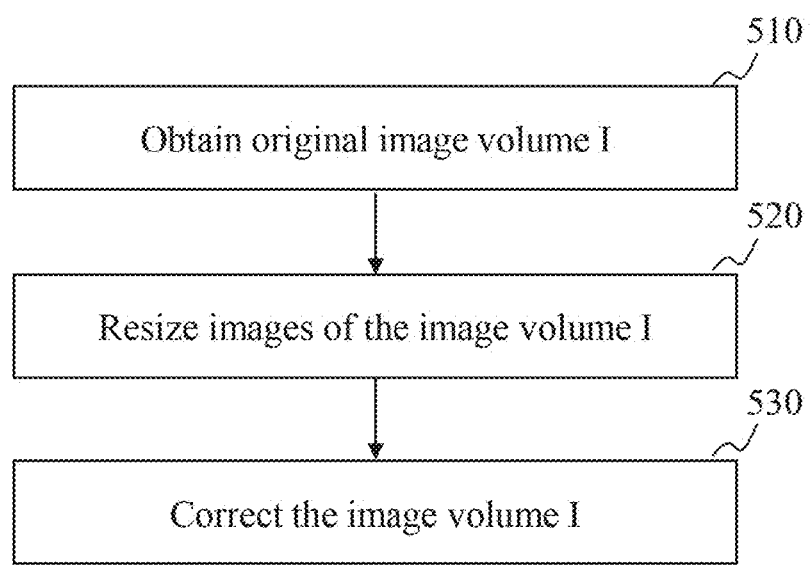
FIG. 5 is a flowchart of an exemplary process for processing image data according to some embodiments of the present disclosure.

FIG. 5 is a flowchart of an exemplary process for processing image data according to some embodiments of the present disclosure.

At 510, the image volume I(:, :, :) may be reconstructed from CT data. The CT data may be acquired by input/output 230, or retrieved from a storage device. The image volume may be reconstructed from a collection of planar images k. In some embodiments, the images k may be perpendicular to the z axis.

At 520, the size of the reconstructed field of view of the images k in the image volume I may be uniformed or standardized according to one or more predetermined parameters. In some embodiments, with 520, images k of the image volume I may have uniform parameters including, for example, pixel number, the size of the FOV, pixel size, etc. In some embodiments, an image k of may be resampled from grid $G_1$, which may be described by Equation (1) to grid $G_2$, which may be described by Equation (3).

In some embodiments, the size of the reconstructed field of view D may be a float number between 80 and 500 mm. In some embodiments, the size of an image matrix of image k $N_x$ may be 512, or 768, or 1024, etc. $N_x$ may depend on one or more parameters applied in the field-of-view reconstruction. In some embodiments, the field of view of the resampled image matrix $D_{fx}$ may be 500 mm.

Grid $G_2$ may be padded with the data of image volume I. Image resizing unit 420 may scan through grids $G_1$ and $G_2$, and determine the values of the pixels in grid $G_2$ based on the value of pixels in the grid $G_1$. As used herein, a pixel (a, b) in a first grid corresponds to a pixel (c, d) in a second grid when $c/a=d/b=N_x/N_{fx}$. If a pixel of grid $G_2$ does not have a corresponding pixel in grid $G_1$, image resizing unit 420 may determine the value of the pixel in grid $G_2$ by way of, for example, interpolation based on the values of a plurality of pixels (e.g., 2, or 3, or 4, or 5, or 6, or 7, or 8, or more than 8 pixels surrounding where a corresponding pixel would be located in grid $G_1$. Exemplary interpolation algorithms may include nearest neighbor interpolation, linear interpolation, bilinear interpolation, quadratic interpolation, cubic spline interpolation. Merely by way of example, image resizing unit 420 may perform nearest neighbor interpolation as shown in Equation (5) to transfer an image k from $G_1$ to $G_2$. With the images k in the image volume I transferred from $G_1$ to $G_2$, a resized image volume $I_d$ with the images k resized from D into $D_{fx}$ may be generated.

At 530, the image volume I may be corrected to reduce or remove the streak. In some embodiments, a streak may include pixels in the MPR image with relatively low intensities compared to their neighbor pixels in the MPR image. In some embodiments, a streak in the MPR image may appear to be about 3 mm wide in the z direction. Operation 530 may reduce or avoid affecting any mid-to-high frequency in-plane features. Detailed description of step 530 may be found in FIG. 7, FIG. 9, and FIG. 11, and the description thereof.

Figure 6:
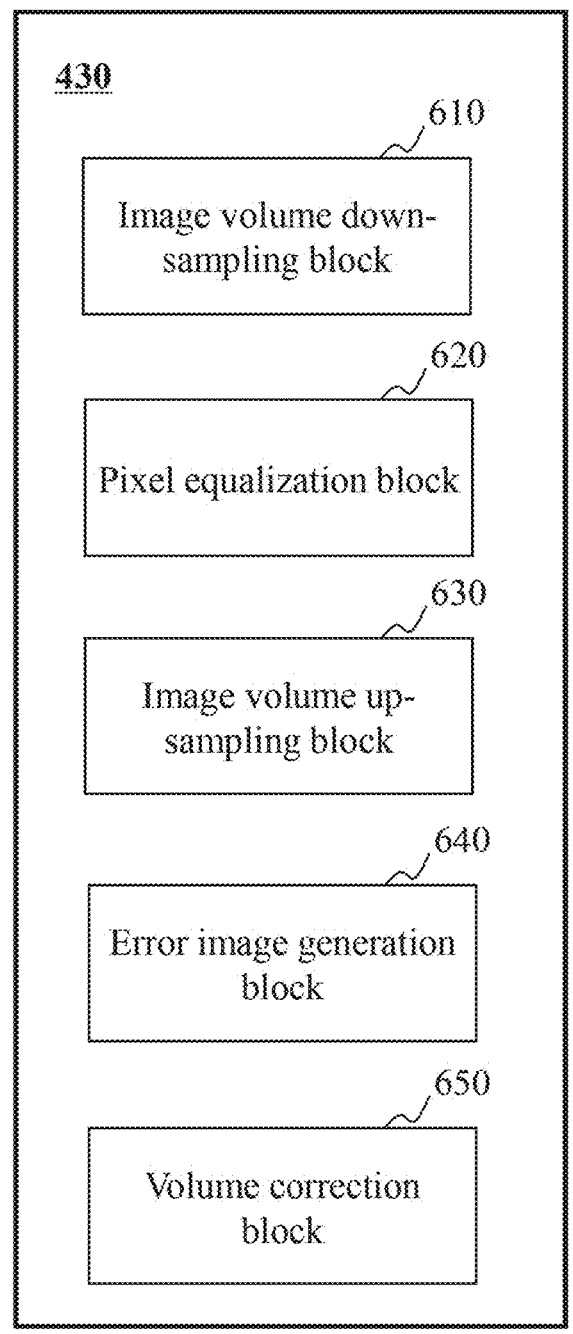
FIG. 6 is a schematic diagram illustrating an exemplary volume correction unit according to some embodiments of the present disclosure.

FIG. 6 is a schematic diagram illustrating an exemplary image volume correction unit 430 according to some embodiments of the present disclosure. As shown in FIG. 6, image volume correction unit 430 may include an image volume down-sampling block 610, a pixel equalization block 620, an image volume up-sampling block 630, an error image generation block 640, and a volume correction block 650. The data processed by image volume correction unit 430 may include projection data, correction data, filtered data, image data (e.g., original image data), or the like, or any combination thereof. Image volume correction unit 430 may perform operations including, for example, data preprocessing, image reconstruction, image correction, image composition, lookup table creation, or the like, or any combination thereof.

Image volume down-sampling block 610 may generate a new image volume from the image volume I or the resized image volume $I_d$ with an image increment. In some embodiments, the image increment may be considered as a distance of neighboring images in the image volume. For example, image increment in the image volume I may be the distance between image k and image k+1. In some embodiments, the image increment may be selected based on the width (e.g., an average width) of streak in a direction of the streak (e.g., the z direction), or referred to as the streak direction, in an MPR image. In some embodiment, image volume down-sampling block 610 may operate on the image volume I or the resized image volume $I_d$ with an image increment. Merely by way of example, the image increment may be 3 mm, and the volume down-sampling block 610 may sample images every 3 mm from the image volume I or the resized image volume $I_d$ to form a down-sampled image volume. Image volume down-sampling block 610 may perform down-sampling in the z-direction on the image volume I or the resized image volume $I_d$ from grid $G_{z1}$ $$G_{z1}=[0:N_z-1]\cdot d_z, \quad (6)$$

to grid $G_{z2}$ $$G_{z2}=[0:d_{tz}:N_z\cdot d_z]. \quad (7)$$

In Equation (6) and Equation (7), the image increment in grid $G_{z1}$ is $d_z$, image number is $N_z$, and the image increment in grid $G_{z2}$ is $d_{tz}$. Grid $G_{z2}$ may be padded with data of grid $G_{z1}$. Image volume down-sampling block 610 may scan through the grids $G_{z1}$ and $G_{z2}$, and determine the pixel values of pixels of grid $G_{z2}$ based on the pixel values of respective corresponding pixels of grid $G_{z1}$, and assign the values of the grid $G_{z1}$ to each pixel in the grid $G_{z2}$. Merely by of example, image 0, 1, 2, ..., N−1 in the image volume I may be distributed in the grid $G_{z1}$ with the image increment $d_z$. Therefore, the distance between image 0 and image 2 is $d_z$ and the distance between image 0 and image $N_z-1$ is $N_z*d_z$. Grid $G_{z2}$, of which the image increment is $d_{tz}$, may have location 0, 1, 2, ..., to be padded. A location in a grid may refer to a position in the grid defined by, e.g., its column number and its row number in the grid. A location in a grid may have a pixel value. To pad location 0 in grid $G_{z2}$, the corresponding image in grid $G_{z1}$ is image 0. However, to pad location 1 in grid $G_{z2}$, the corresponding image in grid $G_{z1}$ is the image at a distance of $d_{tz}$ away from the image 0. If such an image does not exist in $G_{z1}$ (e.g., the distance between image 1 and 0 is bigger than $d_{tz}$), image volume down-sampling block 610 may obtain the pixel value of location 1 in grid $G_{z2}$ by way of, for example, interpolation based on the pixel values of images 0 and 1 in grid $G_{z1}$. Exemplary interpolation algorithms may include nearest neighbor interpolation, linear interpolation, bilinear interpolation, quadratic interpolation, cubic spline interpolation, etc. In some embodiments, image volume down-sampling block 610 may perform nearest neighbor interpolation to transfer axial images k from $G_{z1}$ to $G_{z2}$. For instance, in the example above, image volume down-sampling block 610 may pad location 1 in grid $G_{z2}$ with the pixel value of the corresponding pixel in image 0 in grid $G_{z1}$ if the distance between location 1 to image 0 is smaller than the distance between location 1 to image 1. The remaining locations of grid $G_{z2}$ may be padded in the same manner. In some embodiments, to pad grid $G_{z2}$, nearest neighbor interpolation may be performed, expressed as below.

$$I_z(i,j,:)=\text{nearest}(G_{z1},I_d(i,j,:),G_{z2}). \quad (8)$$

By way of padding $G_{z2}$ as described, a down-sampled image volume $I_z$ with the image increment of $d_{tz}$ may be generated.

Pixel equalization block 620 may equalize down-sampled image volume $I_z$. The pixel equalization block 620 may be implemented on a computing device as exemplified in FIG. 2. In some embodiments, pixel equalization block 620 may equalize pixels causing or relating to a streak from the down-sampled image volume $I_z$. In some embodiments, pixel equalization block 620 may modify the values of pixels causing or relating to a streak from the down-sampled image volume $I_z$ in the z-direction. In some embodiments, the equalization may be performed based on a median filter. More description of pixel equalization block 620 may be found in FIG. 8 and the description thereof. Pixel equalization block 620 may thus generate an equalized image volume $I_m$ in which the values of the pixels causing or relating to the streak have been modified.

Image volume up-sampling block 630 may generate a new image volume using the equalized image volume $I_m$ generated from the pixel equalization block 620 by up-sampling in the streak direction. The image volume up-sampling block 630 may be implemented on a computing device as exemplified in FIG. 2. In some embodiments, image volume up-sampling block 630 may perform up-sampling in the z-direction on the equalized image volume $I_m$ from the grid $G_{z2}$ to the grid $G_{z1}$. Grid $G_{z1}$ may be padded with data of the image volume $I_m$. Merely by way of example, to pad grid $G_{z2}$, nearest neighbor interpolation may be used in which $$I_{z2}(i,j,:) = \text{nearest}(G_{z2}, I_m(i,j,:), G_{z1}). \quad (9)$$

Thus, image volume up-sampling block 630 may generate an up-sampled image volume $I_{z2}$, with $N_z$ reconstructed images k and the values of pixels causing or relating to a streak being modified. In some embodiments, the interpolation algorithm used in the down-sampling may be the same as or different from the interpolation algorithm used in the up-sampling.

Error image generation block 640 may generate an error image volume $I_e$ based on the up-sampled image volume $I_{z2}$ and the down-sampled image volume $I_z$ for the image volume I. The error image volume $I_e$ may include one or more error images. The error image volume may be used to correct the image volume I by modifying the values of pixels causing or relating to a streak. A real structure may remain in the resultant image domain. More description regarding error image generation block 640 may be found in FIG. 10 and the description thereof. The error image generation block 640 may be implemented on a computing device as exemplified in FIG. 2.

Volume correction block 650 may correct the image volume I based on the error image volume $I_e$. The volume correction block 650 may be implemented on a computing device as exemplified in FIG. 2. Merely by way of example, the corrected image volume $I_c$ may be obtained by Equation (10).

$$I_c(:,:,k) = I(:,:,k) - I_e(:,:,k). \quad (10)$$

By modifying the pixel value of the image volume I based on the error image volume $I_e$, the corrected image volume $I_c$ may be generated, on the basis of which an MPR image with reduced streak artifact may be reconstructed. As used herein, a reduced streak artifact may indicate that the number of streaks in an image is reduced, and/or the contrast between a streak and the portions of the image surrounding the streak is reduced.

Figure 7:
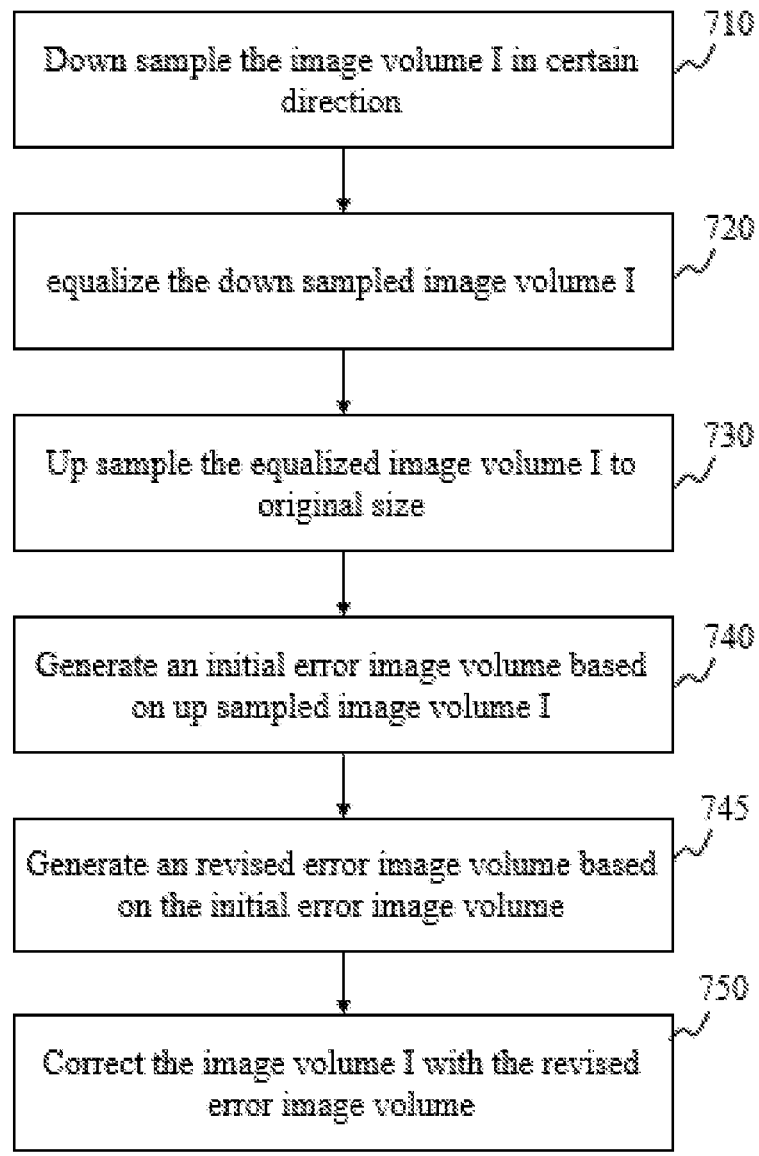
FIG. 7 is a flowchart of an exemplary process for image volume correction according to some embodiments of the present disclosure.

FIG. 7 is a flowchart of an exemplary process for image volume correction according to some embodiments of the present disclosure.

At 710, a new image volume may be generated based on the image volume I with an image increment. The image increment may be selected based on the streak width (e.g., an average width) in a direction of the streak (e.g., the z direction), or referred to as the streak direction. In some embodiments, the image increment may be considered as the distance between neighboring images in the image volume. For example, the image increment in the image volume I may be the distance between image k and image k+1. The image may be generated by image volume down-sampling block 610. In some embodiments, image volume down-sampling block 610 may change the image volume I or the image volume $I_d$ at the interval of an image increment. For instance, the image volume down-sampling block 610 may sample images every 3 mm from the image volume I or the resized image volume $I_d$ to form a down-sampled image volume. For example, image volume down-sampling block 610 may perform down-sampling in the z-direction on the resized image volume $I_d$ from grid $G_{z1}$ (according to, for example, Equation (6)), to grid $G_{z2}$ (according to, for example, Equation (7)).

The grid $G_{z2}$ may be padded with pixel values of the grid $G_{z1}$. In some embodiment, to pad grid $G_{z2}$, nearest neighbor interpolation may be used. See, for example, Equation (8).

At 720, the down-sampled image volume $I_z$ may be equalized. In some embodiments, the equalization may be performed by the pixel equalization block 620. In some embodiments, the values of the pixels causing a streak may be modified. In some embodiments, the values of the pixels causing a streak in the z-direction may be modified. In some embodiments, the equalization may be performed based on a median filter. Detailed description of 720 will be disclosed in FIG. 9. With 720, an equalized image volume $I_m$ may be generated.

At 730, a new image volume may be generated from the equalized image volume $I_m$ with up-sampling in the streak direction. In some embodiments, the new image volume may be generated by image volume up-sampling block 630. In some embodiments, up-sampling in z-direction may be performed on the equalized image volume $I_m$ from the grid $G_{z2}$ to grid $G_{z1}$. The grid $G_{z2}$ may be padded with the data of the equalized image volume $I_m$. In some embodiments, to pad grid $G_{z2}$, nearest neighbor interpolation may be used. See, for example, Equation (9).

Thus, an up-sampled image volume $I_{z2}$ may be generated, with $N_z$ reconstructed images k.

At 740, an error image volume $I_e$ may be generated between each image k of $I_{z2}$ and $I_z$ for the image volume I. In some embodiments, the error image volume $I_e$ may be generated by error image generation block 640. The error images may correct the pixel value of the image volume I by modifying the values of the pixels causing or relating to a streak and avoid affecting the pixels relating to a real structure. Detailed description of step 740 will be disclosed in FIG. 11.

At 750, the image volume I may be corrected based on the error image volume $I_e$. In some embodiments, the correction may be performed by volume correction block 650. The corrected image volume $I_c$ may be obtained by Equation (10).

Figure 8:
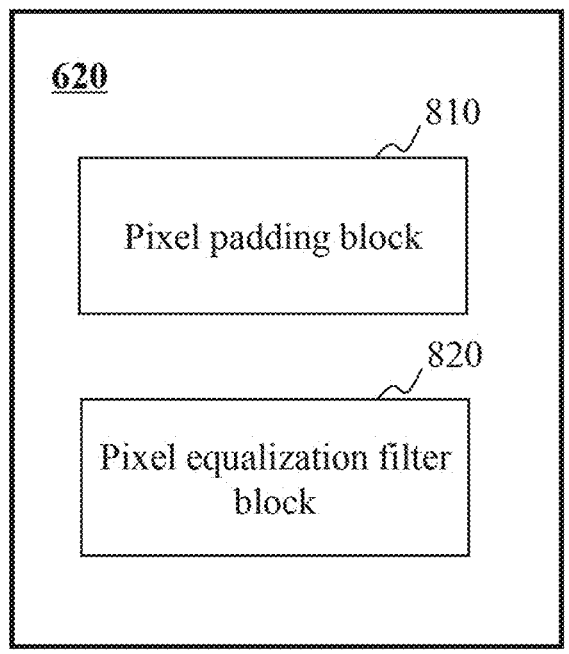
FIG. 8 is a schematic diagram illustrating an exemplary pixel equalization block according to some embodiments of the present disclosure.

FIG. 8 is a schematic diagram illustrating an exemplary pixel equalization block 620 according to some embodiments of the present disclosure. As shown in FIG. 8, pixel equalization block 620 may include a pixel padding block 810 and a pixel equalization filter block 820. The pixel equalization block 620 may be implemented on a computing device as exemplified in FIG. 2.

Pixel padding block 810 may add images into or remove images from the image volume generated by processor 210. For example, if an image volume generated by the image volume generation unit 410 originally has 30 images, pixel padding block 810 may add a certain number of images into the image volume, or remove a certain number of images from the image volume. In some embodiments, the pixel padding block 810 may add certain images into the image volume in a certain order. For example, if an image volume includes images 1, 2, 3, 4, 5, 6, 7, ... 28, 29, 30, 31, 32, 33, and 34, pixel padding block 810 may add image 2 to image 5 at the beginning of the image volume in the reverse order and add images 30 to 33 at the end of the image volume also in a reverse order, generating a new image volume including images 5, 4, 3, 2, 1, 2, 3, 4, 5, 6, 7, ..., 32, 33, 34, 33, 32, 31, and 30. The pixel padding block 810 may be implemented on a computing device as exemplified in FIG. 2.

Pixel equalization filter block 820 may equalize pixels of images k in the image volume. In some embodiments, pixel equalization filter block 820 may operate a median filter through the image volume image by image, replacing a pixel of a certain image k with a characteristic value of corresponding pixels of one or more neighboring images. In some embodiments, the corresponding pixels of neighboring images of (i,j,k) may include pixel (i,j,k−1), (i,j,k+1), etc. In some embodiments, the characteristic value may be the median of grey values of corresponding pixels of one or more neighboring images. Merely by way of example, pixel equalization filter block 820 may run through the image volume (:, :, :) image by image, replacing the pixel grey value of a certain pixel in a certain image with the median of grey values of the corresponding pixels of one or more neighboring images. The number of the neighboring images used in a median filter may be determined based on the size of the median filter. For example, if the size of median filter is 4, to replace the pixel value of pixel (i,j,k), four neighboring images including, e.g., images (:,:,k−2), (:,:,k−1), (:,:,k+1), and (:,:,k+2), may be used. The pixel equalization filter block 820 may be implemented on a computing device as exemplified in FIG. 2.

Figure 9:
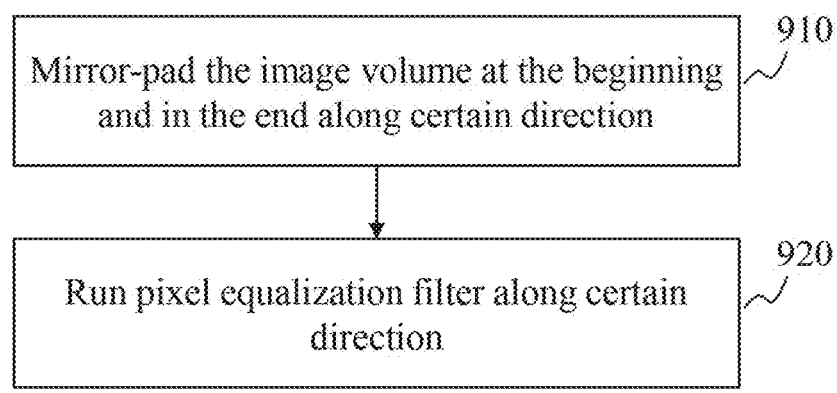
FIG. 9 is a flowchart of an exemplary process for pixel equalization according to some embodiments of the present disclosure.

FIG. 9 is a flowchart of an exemplary process for pixel equalization according to some embodiments of the present disclosure.

At 910, a number of images located at the beginning and/or at the end of the stack of images of the down-sampled image volume $I_z$ in a certain direction (referred to as a padding direction) may be padded while the rest of images of the down-sampled image volume $I_z$ may remain the same. In some embodiments, the padding may be performed by pixel padding block 810. The padding direction may be different from or the same as the streak direction. In some embodiments, the down-sampled image volume $I_z$ may be mirror symmetrically padded. That is, a number of images at the beginning and the same number of images at the end of the down-sampled image volume $I_z$ in the z direction may be subject to a median filter of size m. Merely by way of example, by mirror symmetrically padding, first m+1 images of the down-sampled image volume $I_z$ may be padded into the beginning of the down-sampled image volume $I_z$ in reverse order, and last m+1 images of the down-sampled image volume A may be padded into the end of the down-sampled image volume & in reverse order. For instance, the padding may be performed according to Equations (11)-(13):

$$I_p(i,j,1:m+1)=I_z(i,j,m+2:-1:2), \quad (11)$$

$$I_p(i,j,(m+2):(N_{z2}+m+1))=I_z(i,j,:), \quad (12)$$

and $$I_p(i,j,(N_{z2}+m+2):(N_{z2}+2m+2))=I_z(i,j,(N_{z2}-1):-1:(N_{z2}-m-1)). \quad (13)$$

In Equations (11)-(13), $N_{z2}$ may refer to image number of the down-sampled image volume $I_z$. By way of 910, a mirror-symmetrically padded image volume $I_p$ may be generated.

Merely by way of example, according to Equations (11)-(13), (m+1) images at the beginning of the down-sampled image volume $I_z$ and (m+1) images at the end of the down-sampled image volume $I_z$, may be padded in the reverse order to generate the padded image volume $I_p$. For example, if images in $I_z$ are numbered 1, 2, 3, 4, 5, 6, 7, ..., 28, 29, 30, 31, 32, 33, and 34, and m is 4, by performing 910, images in the padded image volume $I_p$ may include images 6, 5, 4, 3, 2, 1, 2, 3, 4, 5, 6, 7, ..., 32, 33, 34, 33, 32, 31, 30, and 29.

At 920, the padded image volume $I_p$ may be equalized in the padding direction. In some embodiments, the equalization may be performed by pixel equalization filter block 820. In some embodiments, the image volume may be subject to a median filter image by image along the padding direction. By way of the application of the median filter, the value of a pixel of a certain image k may be replaced by a characteristic value of corresponding pixels of one or more neighboring images. In some embodiments, the corresponding pixels of neighboring images of (i,j,k) may include pixel (i,j,k−1), (i,j,k+1), etc. In some embodiments, the characteristic value may be the median of the values of corresponding pixels belonging to one or more neighboring images. Merely by way of example, pixel equalization filter block 820 may run through the image volume (:, :, :) image by image, replacing the pixel value of (i,j,k) with the median of the corresponding pixels belonging to neighboring images (i,j,k−1) and (i,j,k+1). The number of the neighboring images used in a median filter may be determined based on the size of the median filter. For example, if the size of median filter is 4, to replace the pixel value of pixel (i,j,k), four neighboring images including, e.g., images (:,:,k−2), (:,:,k−1), (:,:,k+1), and (:,:,k+2), may be used. For instance, the equalization filter may be performed according to Equations (14)

$$I_m(i,j,:)=\text{median}(I_p(i,j,:),m)). \quad (14)$$

By performing 920, the patterns of a characteristic may be removed from the padded image volume $I_p$. In some embodiments, the patterns may cause streaks in an MPR image. An exemplary characteristic may be a periodic variation of pixel values along a certain direction (e.g., the streak direction). Merely by way of example, the periodicity may be approximately 3 mm wide in the z-direction. A median filter may be used to remove the patterns. A median filter may equalize such a pattern with its neighborhood. By performing 920, the value of a pixel causing or relating to a streak may be equalized with its neighboring pixels in the z-direction. By 920, an equalized image volume $I_m$ may be generated.

Figure 10:
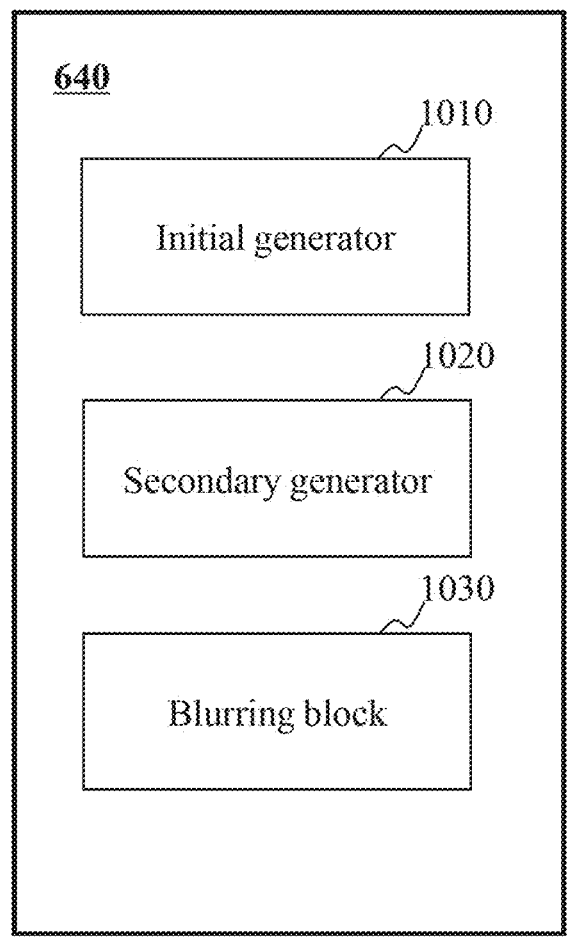
FIG. 10 is a schematic diagram illustrating an exemplary error image generation unit according to some embodiments of the present disclosure.

FIG. 10 is a schematic diagram illustrating an exemplary error image generation unit 640 according to some embodiments of the present disclosure. As shown in FIG. 10, error image volume generation unit 640 may include an initial generator 1010, a secondary generator 1020, and a blurring block 1030. The error image generation unit 640 may be implemented on a computing device as exemplified in FIG. 2.

Initial generator 1010 may generate an initial error image volume according to the down-sampled image volume $I_z$ and the up-sampled image volume $I_{z2}$. In some embodiments, the initial error image volume may be determined based on the difference between the down-sampled image volume $I_z$ and the up-sampled image volume $I_{z2}$. The initial generator 1010 may be implemented on a computing device as exemplified in FIG. 2.

Secondary generator 1020 may generate a revised error image volume. The initial error image volume may be rough, and if used directly, may cause a real structure represented in the image volume I to be erroneously removed. The initial error image volume may be revised by secondary generator 1020. In some embodiments, secondary generator 1020 may identify a pixel in the initial error image volume whose pixel value exceeds a threshold T and erase the value of such a pixel (for example, by zero padding such a pixel). In some embodiments, the threshold T may be determined based on the image volume generated by the image volume generation unit 410. In some embodiments, the threshold T may be set by the processing engine 140. In some embodiments, the threshold T may be provided by a user via a user interface. In some embodiments, the user interface may be implemented on a computing device as exemplified in FIG. 2 or a mobile device as exemplified in FIG. 3. The secondary generator 1020 may be implemented on a computing device as exemplified in FIG. 2.

Blurring block 1030 may smooth the revised error image volume. A revised error image may have some discontinuities due to, for example, the value of a pixel identified as exceeding the threshold T. If such a revised error image volume is used directly, some extra artifact, e.g., a streak, may be introduced into an image obtained based on the revised error image volume. The revised error image may be smoothed by blurring block 1030. In some embodiments, the smoothing may be achieved using a linear filter and/or a non-linear filter. In some embodiments, the non-linear filter may include a median filter, a mean filter, a minimum filter, a maximum filter, a range filter, a ranking filter, an alpha-trimmed mean filter, a minimal mean square error filter, a Gaussian filter, etc. The blurring block 1030 may be implemented on a computing device as exemplified in FIG. 2.

Figure 11:
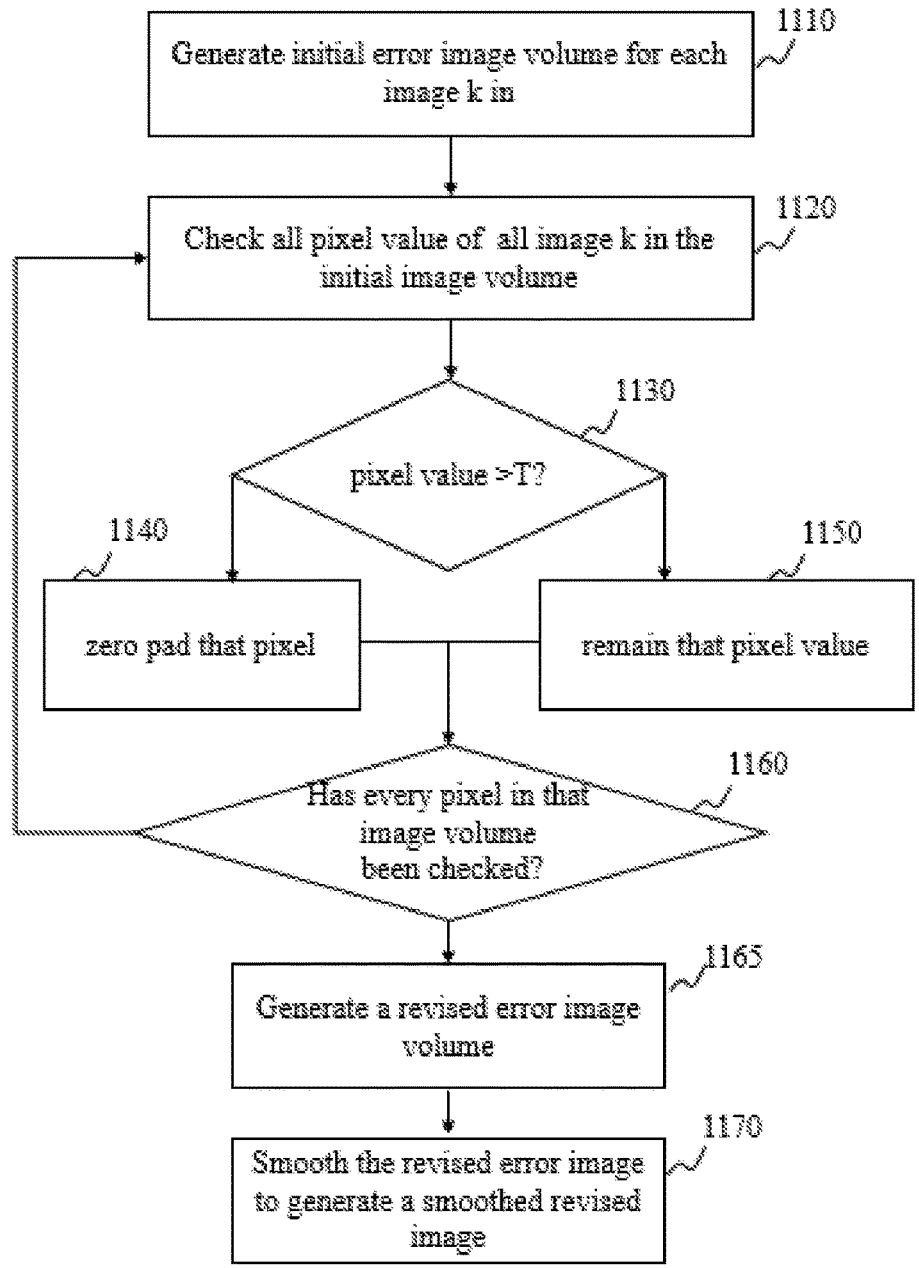
FIG. 11 is a flowchart of an exemplary process for generating an error image volume according to some embodiments of the present disclosure.

FIG. 11 is a flowchart of an exemplary process for generating an error image volume according to some embodiments of the present disclosure.

At 1110, the difference in the pixel value of an image k between $I_z$ and the up-sampled image volume $I_{z2}$ may be determined, thereby generating an initial error image volume $I_{e1}$ based on the difference in the pixel value of all images between $I_z$ and $I_{z2}$. Merely by way of example, the initial error image volume hi may be obtained by Equation (15).

$$I_{e1}(:,:,k)=\text{nearest}(G_2,I_z(:,:,k)-I_{z2}(:,:,k),G_1), \quad (15)$$

At 1120, the pixel values in the initial error image volume $I_{e1}$ may be assessed. For instance, the pixel values in the initial error image volume $I_{e1}$ may be compared with a threshold T to identify pixels whose values exceed the threshold T at 1130. At 1130, if the value of a certain pixel exceeds T, then at 1140, the value of the pixel so identified may be erased (e.g., set pixel value of so identified pixel to zero). At 1130, if the pixel value of a certain pixel does not exceed the threshold T, then at 1150, the value of that pixel may remain unchanged. At 1160, an assessment may be made as to whether all the pixels in the initial error image volume $I_{e1}$ have been checked. After all the pixels have been checked, a revised error image volume $I_{e2}$ may be generated; otherwise, the process may return to 1120.

At 1170, a revised error image volume $I_{e2}$ may be smoothed. In some embodiments, the smoothing may be performed by blurring block 1030. In some embodiments, the smoothing may be achieved using a Gaussian filter to smooth out any discontinuities, and a smoothed error image volume $I_e$ may be generated. Merely by way of example, the standard deviation of the Gaussian filter may be a float value ranging from 0 to 3. In some embodiments, the standard deviation of the Gaussian filter may be set by the processing engine 140. In some embodiments, the standard deviation of the Gaussian filter may be provided by a user via user interface. In some embodiments, the user interface may be implemented on a computing device as exemplified in FIG. 2 or a mobile device as exemplified in FIG. 3.

EXAMPLES

The following examples are provided for illustration purposes, and not intended to limit the scope of the present disclosure.

FIG. 12-A is an original MPR image and FIG. 12-B is a corrected MPR image generated by performing an artifact removal process disclosed herein on the original MPR image illustrated in FIG. 12-A according to some embodiments of the present disclosure. Compared to 1210 of FIG. 12-A, the streak artifact at 1220 of FIG. 12-B was reduced.

FIG. 13-A is an original MPR image and FIG. 13-B is a corrected MPR image generated by performing an artifact removal process disclosed herein on the original MPR image illustrated in FIG. 13-A according to some embodiments of the present disclosure. Compared to 1310 of FIG. 13-A, the streak artifact at 1320 of FIG. 13-B was reduced.

FIG. 14-A is an original MPR image and FIG. 14-B is a corrected MPR image generated by performing an artifact removal process disclosed herein on the original MPR image illustrated in FIG. 14-A according to some embodiments of the present disclosure. Compared to 1410 of FIG. 14-A, the streak artifact at 1420 of FIG. 14-B was reduced.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

I claim:

1. A system comprising:
 at least one processor, and
 instructions that, when executed by the at least one processor, cause the at least one processor to effectuate a method comprising:
 receiving image data;
 retrieving a first image volume from the image data, the first image volume including a plurality of images, at least one image of the plurality of images including a streak artifact of having a streak width along a first direction;

down sampling the first image volume along the first direction at an image increment equal to the streak width to generate a second image volume;

equalizing the second image volume along a second direction to generate a third image volume;

up sampling the third image volume along the first direction to generate a fourth image volume;

determining an error image volume based on the fourth image volume and the first image volume, the error image volume including one or more error images;

correcting the first image volume with the error image volume to generate corrected image volume.

2. The system of claim 1, the method further comprising:
resizing an image of the plurality of images from a first size to a second size.

3. The system of claim 1, wherein the first direction is the same as the second direction, which is a Z direction, and the streak width is 0.1 mm to 5 mm.

4. The system of claim 1, the equalizing the second image volume comprising:
using a median filter.

5. The system of claim 1, the method further comprising:
mirror-symmetrically padding the second image volume along the first direction.

6. The system of claim 1, the method further comprising:
blurring the one or more error images in the error image volume.

7. The system of claim 6, the blurring the one or more error images comprising:
using a Gaussian filter.

8. The system of claim 1, the up sampling and down sampling comprising:
performing nearest neighbor interpolation.

9. A method implemented on at least one device each of which has at least one processor and storage, the method comprising:
receiving image data;
retrieving a first image volume from the image data, the first image volume including a plurality of images, at least one image of the plurality of images including a streak artifact having a streak width along a first direction;
down sampling the first image volume along the first direction at an image increment equal to the streak width to generate a second image volume;
equalizing the second image volume along a second direction to generate a third image volume;
up sampling the third image volume along the first direction to generate a fourth image volume;
determining an error image volume based on the fourth image volume and the first image volume, the error image volume including one or more error images;
correcting the first image volume with the error image volume to generate a corrected image volume.

10. The method of claim 9, the method further comprising resizing an image of the plurality of images from a first size to a second size.

11. The method of claim 9, wherein the first direction is the same as the second direction, which is a Z direction and the streak width is 0.1 mm to 5 mm.

12. The method of claim 9, the equalizing the second image volume comprising:
using a median filter.

13. The method of claim 9, the method further comprising:
mirror-symmetrically padding the second image volume along the first direction.

14. The method of claim 9, the method further comprising:
blurring the one or more error images in the error image volume.

15. The method of claim 14, the blurring the one or more error images comprising:
using a Gaussian filter.

16. The method of claim 9, the up sampling and down sampling comprising:
performing nearest neighbor interpolation.

17. A non-transitory computer readable medium comprising executable instructions that, when executed by at least one processor, cause the at least one processor to effectuate a method comprising:
receiving image data;
retrieving a first image volume from the image data, the first image volume including a plurality of images, at least one image of the plurality of images including a streak artifact having a streak width along a first direction;
down sampling the first image volume along the first direction at an image increment equal to the streak width to generate a second image volume;
equalizing the second image volume along a second direction to generate a third image volume;
up sampling the third image volume along the first direction to generate a fourth image volume;
determining an error image volume based on the fourth image volume and the first image volume, the error image volume including one or more error images;
correcting the first image volume with the error image volume to generate corrected image volume.

18. The system of claim 1, wherein the error image volume is determined by
determining an initial error image volume based on the fourth image volume and the first image volume; wherein the initial error image volume comprises image K having a pixel value,
comparing the pixel value to a threshold T to zero the pixel if the pixel value is greater than T or remain the pixel value if the pixel value is less than T to generate a revised error image volume, and,
determining the error image volume based on the revised error image volume.

19. The method of claim 9,
wherein the error image volume is determined by
determining an initial error image volume based on the fourth image volume and the first image volume; wherein the initial error image volume comprises image K having a pixel value,
comparing the pixel value to a threshold T to zero the pixel if the pixel value is greater than T or remain the pixel value if the pixel value is less than T to generate a revised error image volume, and,
determining the error image volume based on the revised error image volume.

20. The non-transitory computer readable medium of claim 17, wherein the error image volume is determined by
determining an initial error image volume based on the fourth image volume and the first image volume; wherein the initial error image volume comprises image K having a pixel value, comparing the pixel value to a threshold T to zero the pixel if the pixel value is greater than T or remain the pixel value if the pixel value is less than T to generate a revised error image volume, and, determining the error image volume based on the revised error image volume.

\* \* \* \* \*